Patented Mar. 4, 1941

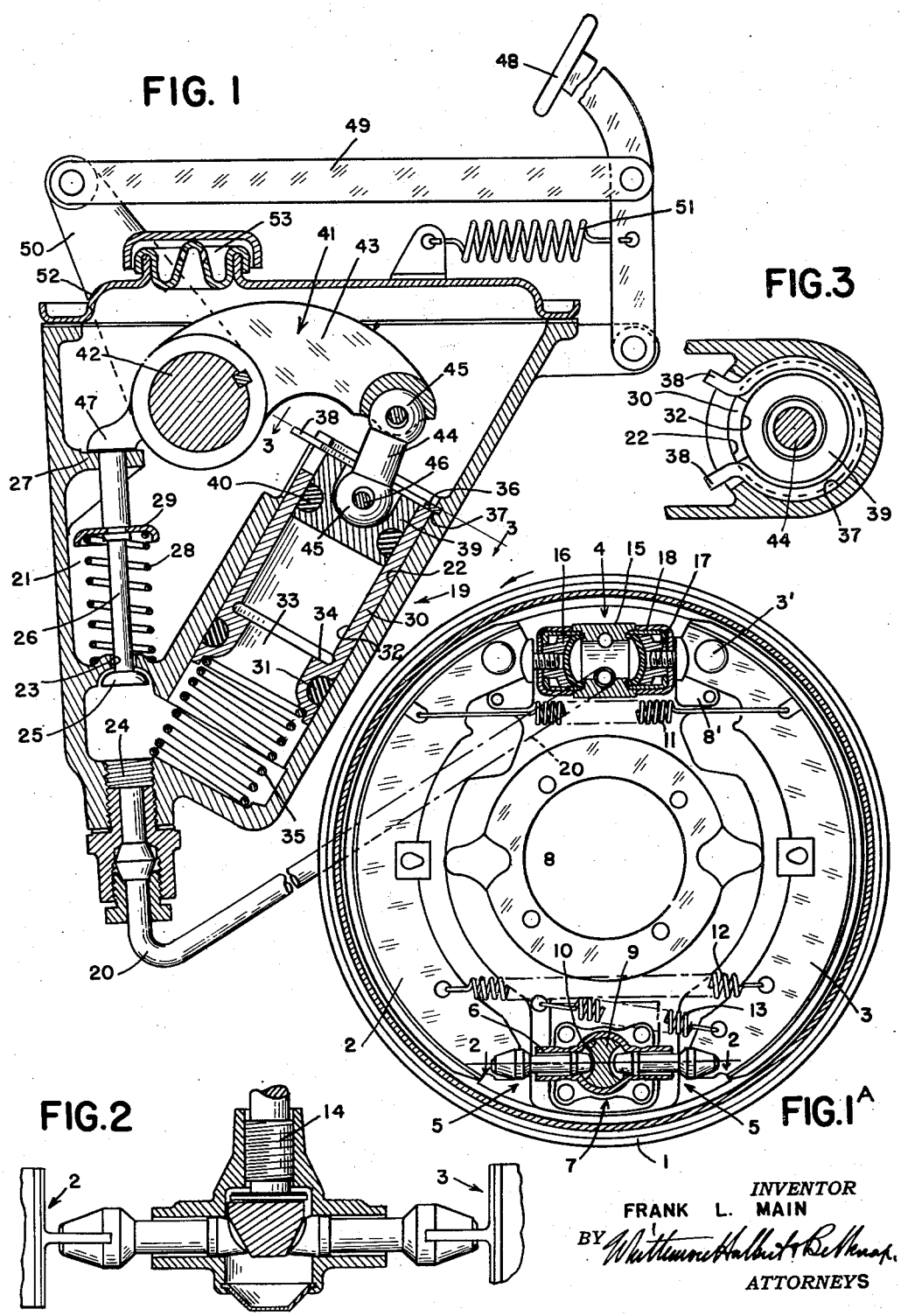

2,233,892

UNITED STATES PATENT OFFICE 2,233,892

HYDRAULIC BRAKE APPARATUS

Frank L. Main, Birmingham, Mich., assignor to Kelsey-Hayes Wheel Company, Detroit, Mich., a corporation of Delaware Application April 18, 1938, Serial No. 202,788

6 Claims. (Cl. 188—152)

The invention relates to hydraulic brake apparatus and refers more particularly to apparatus operable to produce pressure upon braking fluid to apply a brake of the self-energizing type.

The invention has for an object to provide a pressure producing device or master cylinder which is operable during both the earlier and later portions of its advancement to apply a brake and which is so constructed as to increase the resistance to advancement during the later portion.

The invention has for another object to so relate the operation of the pressure producing device or master cylinder to the operation of a self-energizing brake that the resistance to advancement is increased after the brake has been initially applied and becomes energized.

The invention has for a further object to provide an improved construction of pressure producing device or master cylinder which is efficient in operation and may be manufactured at relatively low cost.

These and other objects of the invention will become apparent from the following description, taken in connection with the accompanying drawing, in which Figure 1 is a sectional elevation of a hydraulic brake apparatus showing an embodiment of my invention;

Fig. 1A is a sectional elevation of a brake of the self-energizing type.

Figures 2 and 3 are cross sections on the lines 2—2 and 3—3 respectively of Figure 1.

The apparatus embodying my invention is designed particularly for use with motor vehicles in applying brakes of the self-energizing type. As shown, 1 is one of the brake drums of a motor vehicle and 2 and 3 are brake shoes within the brake drum and engageable with its brake flange. These brake shoes are adapted to be spread apart and applied against the brake flange by the hydraulic actuator or wheel cylinder 4 which is located between the upper ends of the brake shoes, as shown in the present instance. The lower ends of the brake shoes are engageable with the links 5 having stems slidably engaging the axially aligned bores 6 of the housing 7 which is fixedly secured to the backing plate 8. The inner ends of these links are engageable with diametrically opposite slots in the axially adjustable cam 9 which is located within the transverse bore 10 of the housing. Clearance is provided between the cam and the transverse bore.

11 and 12 are retracting springs connected to the brake shoes 2 and 3 respectively near their upper and lower ends. 13 is a spring connected to the lower end of the brake shoe 3 and to the backing plate 8 and adapted to hold the cam 9 against the side of the transverse bore 10 nearest to the brake shoe 2. The clearance between the cam and the transverse bore is sufficient to provide for full wrap of the brake shoe 3 when the brake drum is rotating in the direction indicated by the arrow, the construction being such that upon operation of the actuator or wheel cylinder 4 the upper ends of both the leading brake shoe 2 and the trailing brake shoe 3 are first spread apart. This results in wrapping of the leading brake shoe with the brake flange and its movement therewith to bring the leading end of the trailing brake shoe 3 into contact with the brake flange through the adjustment links and the cam. After the leading end of the trailing brake shoe is brought into contact with the brake flange, the trailing brake shoe then has a full wrap with the brake flange, this being permitted by reason of the construction of the actuator or wheel cylinder. It will be noted that the cam 9 is formed separately from the screw 14 for axially adjusting the cam.

The actuator or wheel cylinder, as shown, is formed of the housing 15 secured to the backing plate 8, the opposed plungers or pistons 16 slidably engaging the end portions of the housing and the screws 17 freely engaging the outer ends of the plungers or pistons and having slotted heads for engaging the ends of the webs of the brake shoes. These screws may be individually adjusted by the nuts 18 threadedly engaging the screws and rotatably sleeved over the end portions of the housing. This construction provides for the full wrap of the brake shoes in that after the initial spreading apart of the upper ends of the brake shoes and while the trailing brake shoe is wrapping into full engagement with the brake flange this trailing brake shoe may move with the brake flange during which time the plunger or piston will move inwardly. Torque is ultimately taken on the bracket 8' through the pin 3', the former being secured to the backing plate 8 and the latter being secured to the brake shoe 3.

19 is the device or master cylinder connected to the actuator or wheel cylinder 4 by the tubing 20 to apply pressure upon the braking liquid to operate the actuator or wheel cylinder. The master cylinder comprises the reservoir 21 and the cylinder 22 formed integral with and at one side of the reservoir. The reservoir is adapted to communicate with the pressure end of the cylinder through the port 23 which is in axial alignment with and, as shown, above the port 24 for placing the master cylinder in communication with the tubing 20. The port is adapted to be closed by the valve 25 which is movable toward the port 24 to open position. The valve has the stem 26 which is guided at its upper end by the bracket 27 formed integral with the body of the reservoir. For normally holding the valve in closed position, there is the coil spring 28 which encircles the valve stem and abuts the lower wall of the reservoir body and the cap 29 secured upon the valve stem.

30 is a piston reciprocable within the bore of the cylinder 22 and provided with the annular packing member 31 which is preferably formed of rubber. This piston is formed with the bore 32 and also with the opening 33 through its pressure end and in axial alignment with the bore 32. The opening is of less diameter than the bore resulting in the annular shoulder 34. 35 is a coil spring for normally urging the piston 30 to its retracted position, which is determined by engagement of the upper end of the piston contacting with the stop 36. This stop is in the nature of a wire extending partially into the groove 37 formed in the cylinder. To facilitate assembly of the stop in the groove, the stop is formed with the diverging end portions 38 which extend into the reservoir beyond the cylinder. 39 is a second piston smaller than the piston 30 and reciprocable in its bore 32. This smaller piston is provided with the annular packing member 40 which is preferably in the nature of a rubber ring.

For reciprocating the smaller piston, I have provided the bell crank 41 which is located within the reservoir and secured upon the shaft 42 which extends transversely through and is journaled in the side walls of the reservoir body. The arm 43 of the bell crank is connected to the smaller piston by means of the link 44 which has at its opposite ends ball portions 45 for abutting correspondingly shaped bearings formed upon the smaller piston and the arm. These ball portions are connected to the smaller piston and bell crank arm by the transverse pins 46, the diameters of the holes in the ball portions through which the pins extend being larger than the diameters of the pins to provide for limited lost motion.

The bell crank is also provided with the arm 47 on the side of the shaft 42 opposite the arm 43 and adapted to engage the valve stem 26 to open the valve when the smaller piston is in retracted position.

The bell crank is adapted to be actuated by the foot pedal 48 through the link 49 connected at one end to the foot pedal and at the other end to the lever 50, which latter is secured upon an end of the shaft 42 beyond the reservoir body. 51 is a suitable spring connected to the foot pedal to normally hold the same in its inoperative or off position as determined by engagement of the arm 47 with the bracket 27.

The upper end of the reservoir body is closed by the cover 52 which is suitably secured to the reservoir body and which is provided with the breather 53.

In operation, when the foot pedal 48 is depressed, the valve 25 is allowed to move to closed position and the smaller piston 39 is advanced to apply pressure to the braking liquid and thereby operate the actuator or wheel cylinder 4. Upon continued movement, the smaller piston 39 comes into engagement with the annular shoulder 34 of the larger piston 30 and then advances the larger piston. The advancement of the larger piston causes an increased resistance to further depression of the foot pedal and occurs preferably after both brake shoes have become fully wrapped and the brake has become energized. As a result, the operation of the brake may be more readily controlled.

What I claim as my invention is:

1. A master cylinder for a fluid operated brake of the self-energizing type, comprising a reservoir, a cylinder adapted to communicate with said reservoir and having a port for the passage of braking fluid under pressure to apply the brake, a piston reciprocable within said cylinder having a bore and a reduced opening at its pressure end providing a shoulder between the bore and opening, a second piston reciprocable within the bore of said first mentioned piston and adapted during its advancement to abut said shoulder to thereby advance said first mentioned piston, means for reciprocating said second piston, means for retracting said first mentioned piston after its advancement and upon retraction of said second piston, and a valve for controlling the communication between said reservoir and the portion of said cylinder beyond the pressure end of said first mentioned piston, said valve being operated by said piston reciprocating means.

2. A master cylinder, comprising a reservoir, a cylinder adapted to communicate with said reservoir, a piston within said cylinder having a bore and a reduced opening at its pressure end providing a shoulder between the bore and opening, a second piston within the bore of said first mentioned piston and having its pressure end engageable with said shoulder during the advancement of said second piston, a coil spring within said cylinder for retracting said first mentioned piston upon retraction of said second piston, a bell crank within said reservoir and operatively connected to said second piston for reciprocating the same, a valve controlling the communication between said reservoir and cylinder and operable by said bell crank, and means upon said cylinder engageable with said second piston for limiting the retractile movement thereof.

3. In a hydraulic brake system for vehicles, a revoluble brake drum, self-energizing friction means supported within said drum for limited shifting movement with the drum in the direction of rotation thereof, fluid operated actuating means associated with said friction means and adapted to move the latter into engagement with said drum, said fluid operated actuating means comprising an operating member, a cylinder having a port for the passage of braking fluid to said fluid operated actuating means, a pair of pistons within said cylinder for forcing braking fluid through said port, one of said pistons being smaller than the other and being adapted to be advanced upon initial movement of said operating member to force said friction means into engagement with said drum, and cooperating means upon said piston for subsequently advancing the larger piston with the smaller piston to prevent excess self-energization and application of the friction means.

4. In a hydraulic brake system for vehicles, a revoluble brake drum, self-energizing friction means supported within said drums for limited shifting movement with said drum in the direction of rotation of said drum, fluid operated actuating means associated with said friction means and adapted to move the latter into engagement with said drum, said fluid operated actuating means comprising a pair of cylinders of different diameters, a high pressure piston reciprocable within the smaller of said cylinders, a low pressure piston reciprocable in the larger of said cylinders, and an operating member adapted during the first portion of its stroke to advance said high pressure piston providing movement of braking fluid to said fluid operated actuating means to force said friction means into engagement with said drum, said operating member being effective during the latter portion of its stroke to advance said low pressure piston to decrease the rate of force application upon said friction means to prevent excess self-energization and application thereof.

5. In a hydraulic brake system for vehicles, a revoluble brake drum, self-energizing friction means supported within said drum for limited shifting movement with said drum in the direction of rotation thereof, fluid operated actuating means adapted to force said friction means into engagement with said drum, a master cylinder comprising high pressure producing means, low pressure producing means, and means for operating said high pressure producing means to force braking fluid to said fluid operated actuating means to force said friction means into engagement with said drum, said operating means being effective upon further movement thereof to operate said low pressure producing means to increase the resistance to advancement of said operating means to prevent excess application and self-energization of said friction means.

6. In a hydraulic brake system for vehicles, a revoluble brake drum, self-energizing friction means supported within said drum for shifting movement with the drum in the direction of rotation thereof, fluid operated actuating means adapted to force said friction means into engagement with said drum, a master cylinder comprising high pressure producing means, low pressure producing means, means for initially subjecting said fluid operated actuating means to the action of said high pressure producing means to force said friction means into engagement with said drum, and means for subsequently subjecting said fluid operated actuating means to the action of said low pressure producing means to prevent excess application and self-energization of said friction means.

FRANK L. MAIN.